United States Patent [19]

Taccone

[11] 4,321,034
[45] Mar. 23, 1982

[54] COAL BURNERS, ROTARY FURNACES INCORPORATING THE SAME AND METHODS OF OPERATING

[75] Inventor: Charles C. Taccone, Clearfield, Pa.

[73] Assignee: Clearfield Machine Company, Clearfield, Pa.

[21] Appl. No.: 136,886

[22] Filed: Apr. 3, 1980

[51] Int. Cl.³ .................. F27B 7/02; F23K 5/00
[52] U.S. Cl. ...................... 432/105; 110/106; 110/261; 110/263; 110/264
[58] Field of Search .............. 110/260–265, 110/254, 246, 347, 106; 432/103, 105

[56] References Cited

U.S. PATENT DOCUMENTS

| | | | |
|---|---|---|---|
| 744,220 | 11/1903 | Neu | 110/260 |
| 1,468,008 | 9/1923 | Dyson | 110/261 |
| 1,823,381 | 9/1931 | Sherwood | 110/261 |
| 2,292,243 | 8/1942 | Schwartz | 110/264 |
| 3,941,065 | 3/1976 | Albrecht | 110/254 |
| 4,094,625 | 6/1978 | Wang et al. | 110/261 |
| 4,147,116 | 4/1979 | Graybill | 110/264 |
| 4,173,189 | 11/1979 | Cooper | 110/263 |
| 4,182,245 | 1/1980 | Stewart et al. | 110/106 |
| 4,206,712 | 6/1980 | Vatsky | 110/264 |
| 4,221,174 | 9/1980 | Smith et al. | 110/263 |

FOREIGN PATENT DOCUMENTS 118016  1/1944  Australia .................. 110/265

Primary Examiner—Henry C. Yuen
Attorney, Agent, or Firm—Buell, Blenko, Ziesenheim & Beck

[57] ABSTRACT

A coal burner and rotary metal melting furnace incorporating the same is provided in the form of a generally cylindrical furnace rotatable about a horizontal axis and fired through one end with pulverized coal and preheated air through a burner structure which impinges the preheated air in a helical path against a conical spray of finely divided coal.

8 Claims, 12 Drawing Figures

COAL BURNERS, ROTARY FURNACES INCORPORATING THE SAME AND METHODS OF OPERATING

This invention relates to coal burners, rotary furnaces incorporating the same and methods of operating the same and particularly to a coal burner for burning pulverized coal and a rotary hearth furnace operated on pulverized coal as the source of fuel.

Coal burners using pulverized coal have been heretofore proposed for various purposes. Rotary furnaces have been used since the 1920's for melting ferrous materials in the foundry industry. When first introduced into the industry, they were fired with pulverized coal. This practice continued into the 1940's until the availability and cost of oil and natural gas made coal unattractive as a fuel source. This happened in many other industries and in many types of furnaces. Thereafter, virtually all furnaces were either oil or gas fired and most old furnaces converted to oil or gas. With the price and availability of oil and natural gas becoming an increasing problem of unknown magnitude, the desirability of returning to the use of pulverized coal or other non-petroleum fuel becomes immediately apparent. Unfortunately, the problem of environmental pollution as well as economics, must now be taken into consideration. In order to operate a coal fired burner as exemplified by a rotary furnace for melting iron with pulverized coal, new equipment and methods had to be devised. While I will hereafter illustrate the burner in connection with a rotary metal melting furnace, it may be similarly used in rotary kilns, calciners, continuous kilns, periodic kilns, heat treat ovens, annealing ovens, tower ovens, incinerators, boilers, various other melting furnaces and similar structures presently heated by oil, gas, or electric.

I have developed a new burner for use with pulverized coal and a method of operating the same. This burner is exemplified in a rotary furnace structure which reduces the amount of oil required by about 90%, reduces the cost of operating the furnace by about one half and at the same time reduces the time per melt by an amount equivalent to a 20% increase in capacity of the furnace.

I provide a burner means for efficiently burning pulverized coal comprising a cylindrical burner housing, a fuel inlet line spaced from and extending axially of said burner housing within said housing and having a discharge end and an inlet end, a combustion air passage in said housing surrounding and coaxial with the fuel inlet line, a heat resistant diverter member on the discharge end of the fuel inlet line for creating a hollow generally conical discharge pattern in the fuel leaving the discharge end, a generally helical flight on the external periphery of the fuel inlet line in the air passage surrounding the fuel inlet line terminating adjacent the diverter whereby air in the air passages follows said flight and strikes the hollow conical fuel discharge in a helical path, means delivering preheated air to said combustion air passage spaced from the helical flight at the end opposite the diverter member, and means delivering pulverized coal to said fuel inlet line adjacent the inlet end in fluid suspension. A removable cover means may be provided on the inlet end of said fuel inlet line and means removably insertable into the inlet end of said fuel inlet line for delivering a stream of liquid or gaseous hydrocarbon fuel for furnace start-up and heating when said cover is removed. Means may be provided on the inlet line for adjusting the position of the inlet end of the fuel inlet line and diverter member relatively to the helical flight in the air passage. Means may also be provided for introducing oxygen into the air inlet means for oxygen enrichment of the combustion air.

Preferably, the diverter means is made up of refractory material such as ceramic. The diverter is also preferably adjustable axially to control the conical fuel discharge. In the case of a rotary metal melting furnace I provide a generally cylindrical furnace rotatable on a horizontal axis, a charging opening at one end of said furnace on its axis, means for rotating said furnace about its axis, a burner opening in the other end of said furnace on its axis, and a burner means according to this invention in said burner opening. Preferably, a recuperator means is provided adjacent the furnace exhaust opening having interchangeable charger means and connecting means between the furnace exhaust and recuperator means are provided at the furnace exhaust opening. Scrubber means are preferably provided adjacent the recuperator means receiving exhaust gases from the recuperator means for cleaning and exhausting to the air.

In the foregoing general description certain objects, purposes and advantages of this invention have been set out. Other objects, purposes and advantages of the invention will be apparent from a consideration of the following description and the accompanying drawings in which.

Figure 1:
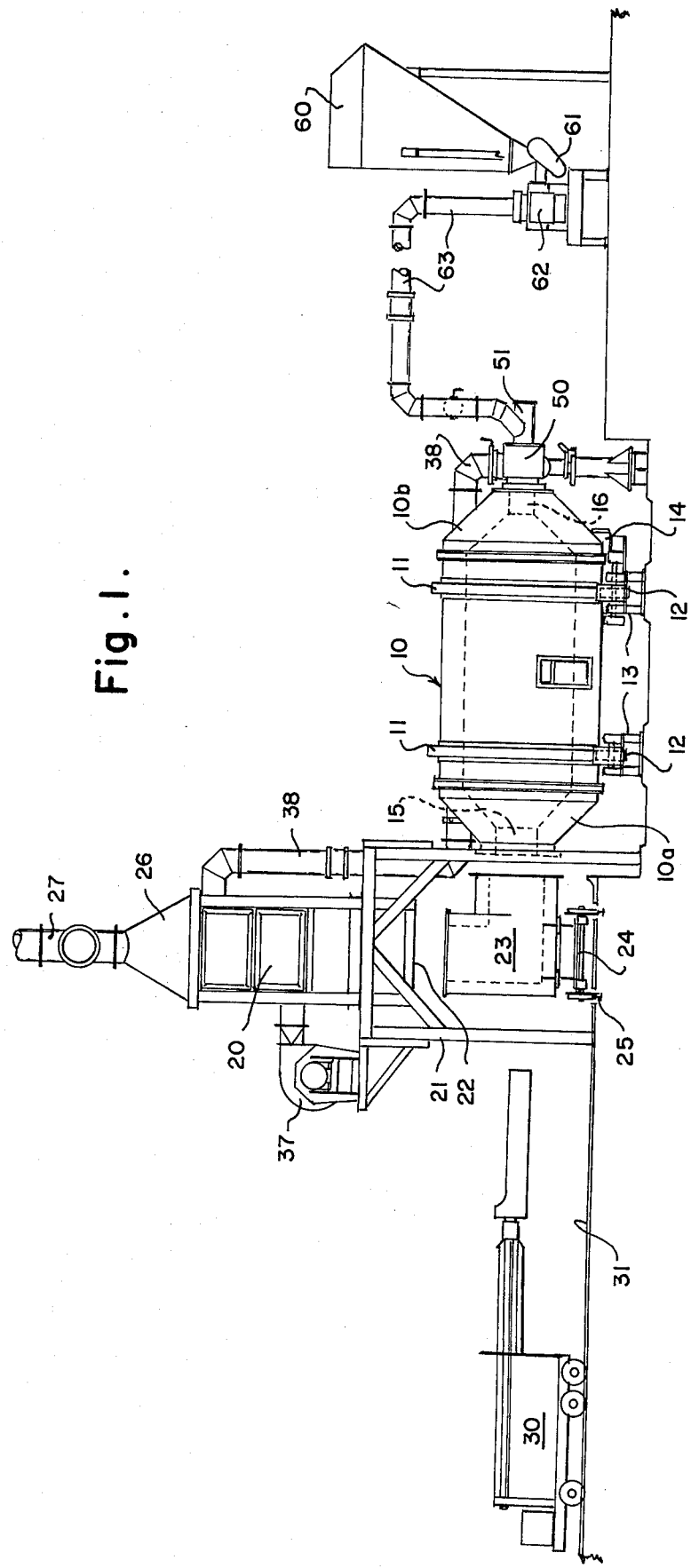
FIG. 1 is a side elevational view of a furnace according to this invention.
Figure 2:
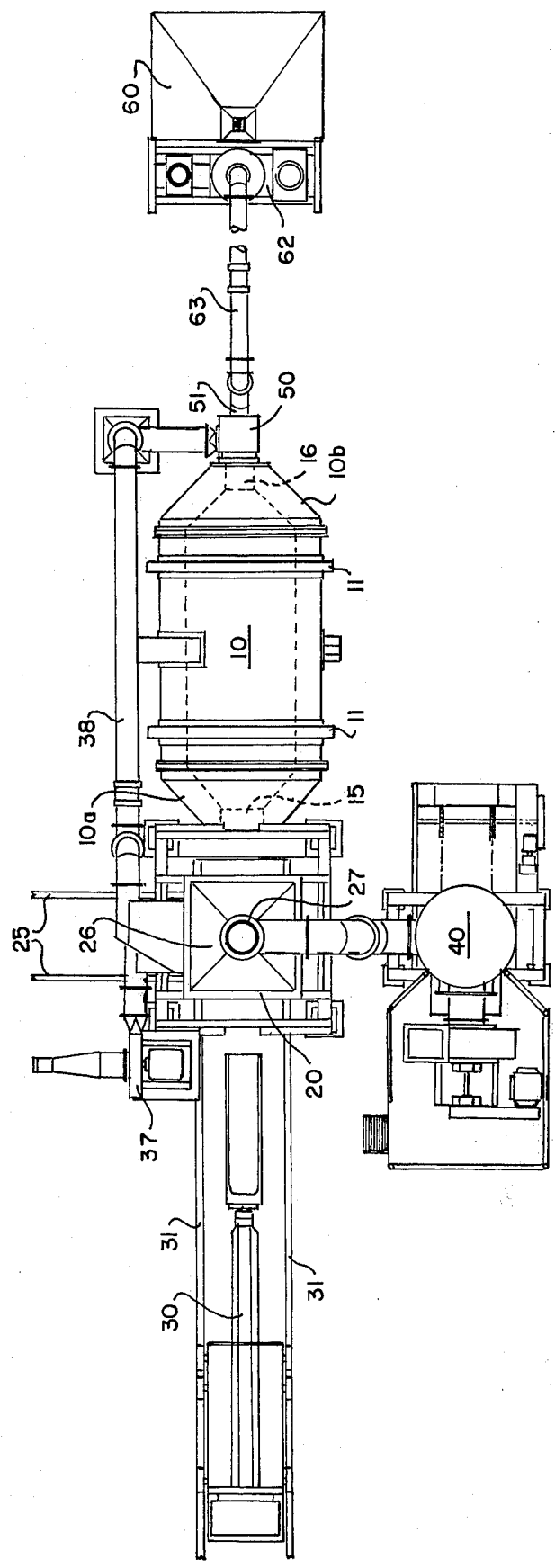
FIG. 2 is a top plan view of the furnace of FIG. 1.
Figure 4:
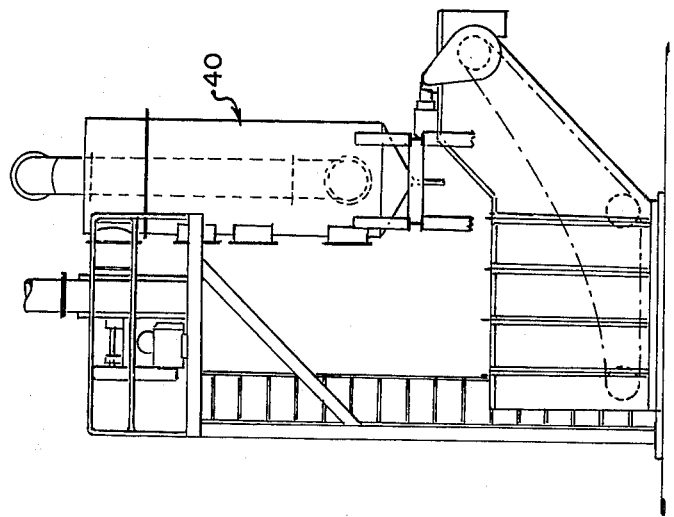
FIG. 4 is a side elevational view of the scrubber arrangement of FIGS. 1, 2 and 3.
Figure 3:
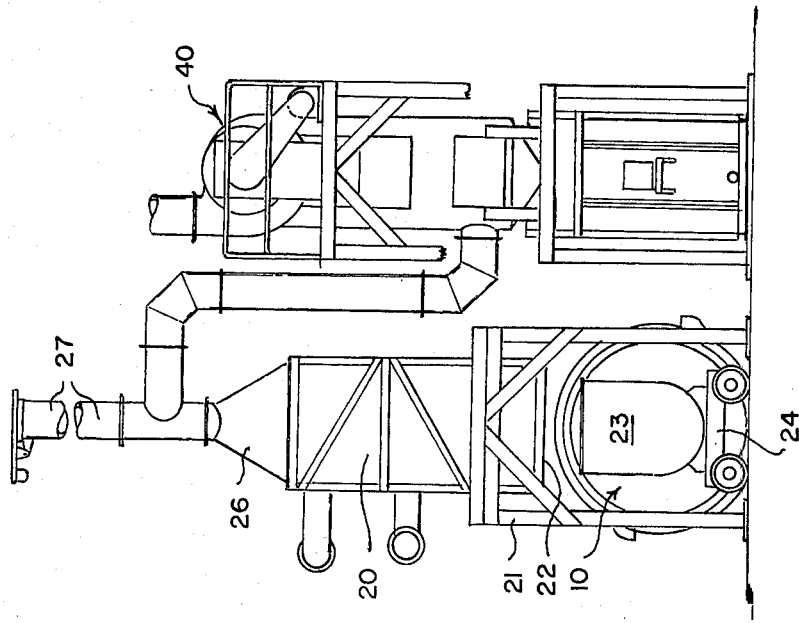
FIG. 3 is a section on the line III—III of FIG. 2.

Referring to the drawings, there is illustrated a generally cylindrical rotary furnace 10 carrying spaced drive rings 11 supported on drive rollers 12 mounted on base frames 13. At least one of the drive rollers 12 is driven by a motor 14 so as to rotate the furnace about its horizontal axis. The furnace 10 has conical ends 10a and 10b, one of which has a charging opening 15 and the other of which has a burner opening 16. A recuperator assembly 20 is mounted on a frame work 21 adjacent the charging opening 15 and is selectively connected at its bottom end 22 to the charging opening 15 by means of a right angle flue member 23 mounted on a carriage 24 travelling on trackway 25 transverse to the axis of the furnace. The flue member 23 can thus be moved away from charging opening 15 to permit access into the furnace by furnace charging assembly 30 movable on tracks 31 parallel to the furnace axis. The other end 26 of the recuperator assembly is connected to an exhaust flue 27 which may go directly to the atmosphere or to a scrubber assembly 40 where the exhaust gases are subject to water sprays to remove particulates and other atmospheric pollutants from the gases before being discharged to atmosphere.

A blower 37 forces fresh air through a heat exchanger in the recuperator to a preheated air line 38 which goes to a burner assembly 50 in burner opening 16. The burner assembly 50 includes a fuel inlet line 51 axially of the burner assembly surrounded by a combustion air passage 52 which is in turn surrounded in part by a preheated air manifold 53 connected to line 38. Preheated air is thus delivered from the recuperator 20 through manifold 53 into passage 52. The fuel inlet line 51 is provided with at least one outer helical vane 54 extending into passage 52 to cause the air to follow a helical path as it enters the furnace at the end of the burner assembly. The fuel inlet line 51 is provided with a ceramic diverter member 55 having a generally conical shape and held in the end of a telescoping inlet line 56 by a spider 57 and conical ceramic nut on bolt 59.

A coal hopper 60 is provided adjacent burner assembly 50 and feeds coal to a pulverizer 61 which pulverizes the coal to about 200 mesh (U.S.) or finer after which it passes to blower 62 where the finely pulverized coal is fluidized in air or other carrier gas and carried through pipe 63 into burner inlet line 51.

A removable end cap 70 on the inlet line 51 permits the introduction of a gas or oil nozzle 71 (chain line) into the inlet line 51 for firing the furnace at start-up in order to obtain maximum efficiency and minimum of emission of pollutants. After firing for eight to ten minutes to preheat the furnace and charge, the nozzle 71 is removed, the cap 70 replaced and the furnace is operated on pulverized coal. This is not essential to the operation of the burner but it does reduce the emission of pollutants at start-up of the burner in most installations.

Thus, in operation, the furnace is first preheated with oil or gas through burner 71 and inlet line 51 and preheated air through line 38, manifold 53, air passage 52 and around helical flight 54 to mix with the fuel oil or gas entering the furnace in a conical fan-like spray from diverter member 55. After the furnace is heated for eight to ten minutes, nozzle 71 is removed, cap 70 is replaced and pulverizer 61 and blower 62 are started and fluidized, pulverized coal is blown through pipe 63 into inlet line 51 and around diverter member 55 into the preheated air coming from helical vane 54. This air and pulverized coal mixture is a highly efficient source of heat for melting as will be more specifically shown hereafter.

Figure 5:
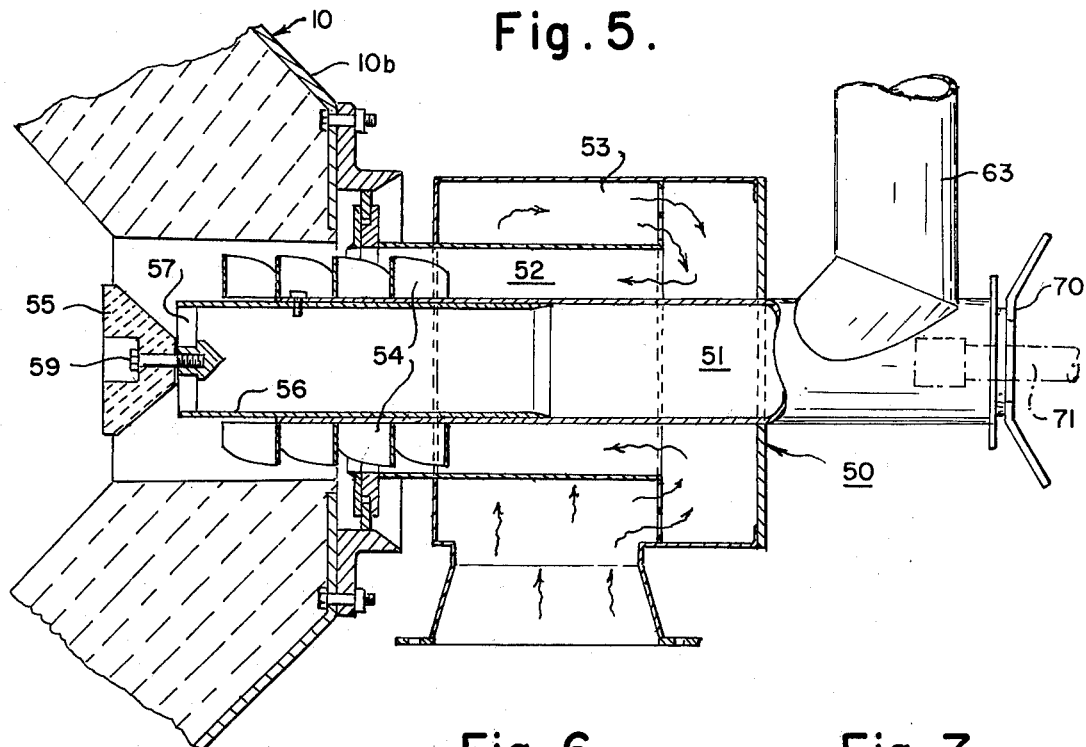
FIG. 5 is a fragmentary section through the furnace inlet and burner housing.
Figure 6:
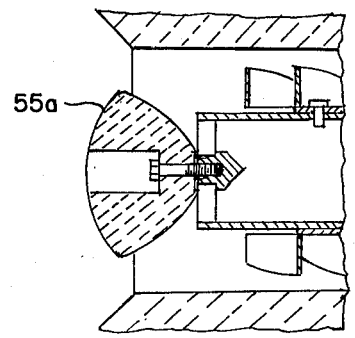
FIGS. 6 through 10 are sectional views of various alternative embodiments of ceramic diverter for use in this invention.
Figure 7:
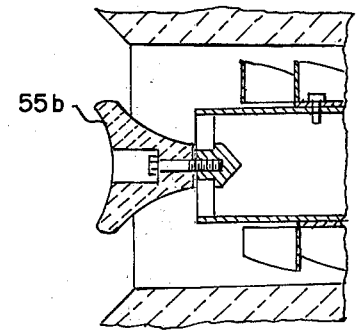
Figure 8:
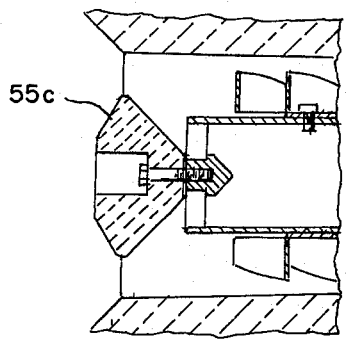
Figure 9:
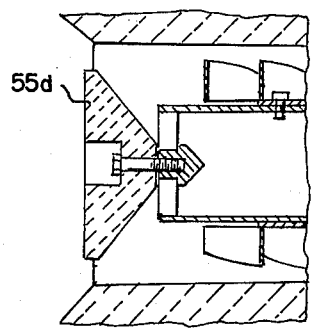
Figure 10:
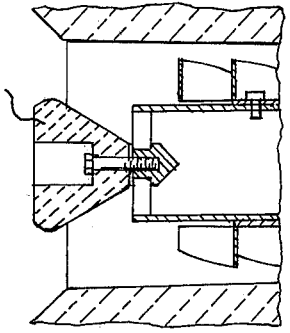

In FIGS. 6 through 10 are illustrated five modifications of the ceramic diverter 55. All parts which are the same as those in FIG. 5 are given like numbers. Only the diverter members differ, and they are identified as 55a, 55b, 55c, 55d and 55e, respectively.

Figure 11:
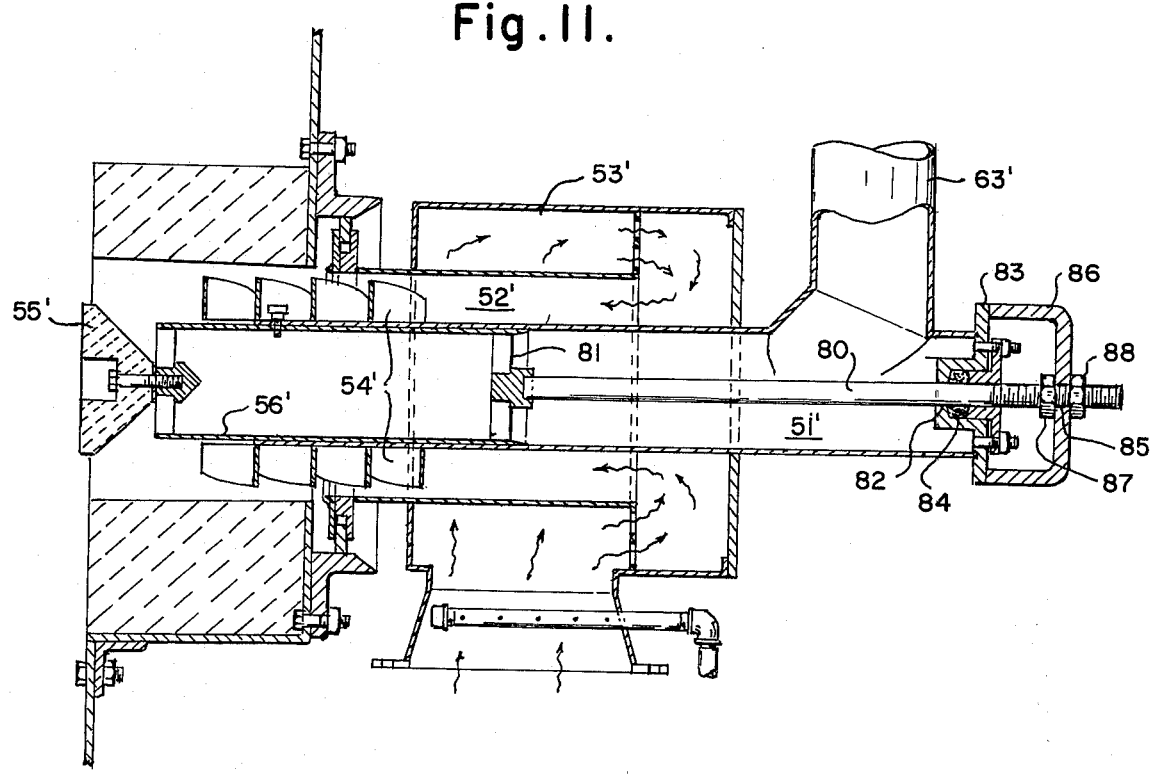
FIG. 11 is a fragmentary section through the furnace inlet and a second embodiment of burner housing.

In FIG. 11 there is illustrated an embodiment of furnace similar to that of FIG. 5 in which like parts are given like numerals with a prime suffix. In this embodiment a burner adjusting rod 80 is fixed at one end to a spider 81 in the telescopic inlet line 56' at the end opposite diverter spider 57'. The other end of rod 80 goes through an opening 82 in end cap 83, through seal 84 and is adjustably held in opening 85 in carrier 86 by adjusting nuts 87 and 88.

Figure 12:
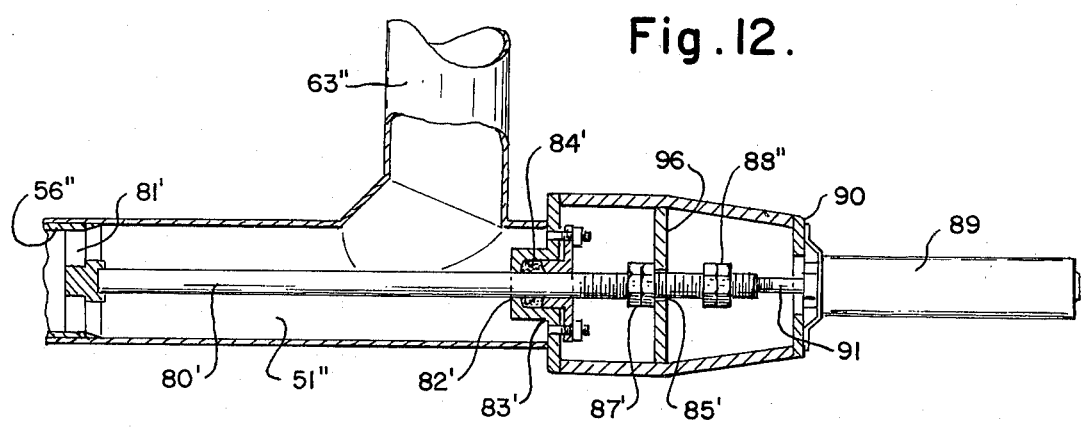
FIG. 12 is a fragmentary section through a second embodiment of burner housing with an air cylinder control means for the burner adjustment.

In FIG. 12 there is illustrated still another embodiment similar to that of FIG. 5 but including a power-operated burner adjustment. In this embodiment, those parts which are the same as parts in FIG. 5 bear like numerals with a double prime suffix. Here, as in FIG. 11, a burner adjusting rod 80' is fixed at one end to a spider 81' in telescoping inlet line 56". The other end of rod 80' passes through opening 82' in end cap 83', through seal 84' and through opening 85' in stop member 96. Stop nuts 87' and 88' on opposite sides of stop member 96 limit the travel of rod 80'. An air cylinder 89 on carrier 90 actuates the rod 80 axially of inlet line 51" by means of piston 91 threaded into a threaded opening in the end of rod 80' so as to change the position of the diverter member and inlet pipe relatively to the helical vane.

In both the embodiments of FIGS. 11 and 12, movement of the telescoping inlet member 56' or 56" relatively to inlet pipe 51' or 51" and the attached helical vane will vary the flame as required during the furnace program.

The efficiency of operation achieved by this furnace as compared to a like rotary furnace heated with oil is illustrated by comparing Tables 1 and 2 below, based upon Jan. 15, 1980 prices:

TABLE I

The data is derived from 75 heats in an oil fired rotary furnace with an average charge of 8270 lbs. Data adjusted to 9000 lbs. charge.

| | |
|---|---|
| 1. Total time for heat from time furnace is charged to slagging, 4.76 hours, or | 4 hrs. 46 mins. |
| 2. Time required to melt only, 3.53 hours or | 3 hrs. 32 mins. |
| 3. Fuel oil used in maintenance of refractory lining per heat average over one year's service | 15.7 gallons |
| 4. Fuel oil used to tapping furnace (2608 F.) Firing rate 54 GPH × 4.53 hours firing time | 173.3 gallons |
| 5. Fuel oil used during pouring off and slagging. Firing rate 54 GPH × 1.23 hrs. firing time | 66.4 gallons |
| 6. Total oil used 15.7 + 173.3 + 66.4 | 255.4 gallons |
| 7. Horse power to operate furnace | 25.5 HP |
| 8. Horse power to operate air compressor to atomize oil | 10 HP |
| 9. Total Horse power 25.5 + 10 | 35.5 HP |
| 10. Cost of fuel oil 255.4 × .859 (cost of 1 gal. fuel oil) | $219.39 |
| 11. Cost of electricity 35.5 × .746 × 4.76 × .048 (cost per KWH) | $6.05 |
| 12. Total cost of energy to melt 9000 lbs. iron $219.39 + $6.05 | $225.44 |
| 13. Cost for energy per pound of melted iron $225.44 divided by 9000 $0.02504 or approx. | 2½ ¢ |

TABLE II

The data is derived from 75 heats in a pulverized coal fired rotary furnace with an average charge of 8640 lbs. Data adjusted to 9000 lbs. charge.

| | |
|---|---|
| 1. Total time for heat from time furnace is charged to slagging, 3.9 hrs. or | 3 hrs. 54 mins. |
| 2. Time required to melt only, 2.67 hrs. or | 2 hrs. 40 mins. |
| 3. Fuel oil used in maintenance of refractory lining per heat. Average over one year's service (same as oil fired furnace) | 15.7 gallons |
| 4. Fuel oil used to preheat furnace and charge to keep smoke and emissions to a minimum, firing rate 54 GPH × 15 minutes | 13.5 gallons |
| 5. Coal firing rate pounds per hour | 627 lbs. |
| 6. Coal used up to tapping furnace (2605° F.) 627 × 2.42 hrs. firing time | 1517 lbs. |
| 7. Coal used during pouring off and slagging, 627 × 1.23 hrs. firing time | 771 lbs. |
| 8. Horse power to operate furnace | 25 HP |
| 9. Horse power to operate Coal Pulverizer | 35.5 HP |
| 10. Horse power to operate Scrubber | 16.5 HP |
| 11. Total Horse Power, 25 + 35.5 + 16.5 | 77HP |
| 12. Cost of fuel oil 15.7 + 13.5 × .859 (cost per gallon fuel oil) | $25.08 |

TABLE II-continued

The data is derived from 75 heats in a pulverized coal fired rotary furnace with an average charge of 8640 lbs. Data adjusted to 9000 lbs. charge.

| | |
|---|---|
| 13. Cost of coal 1517 + 771 × .022 (price of coal per lb.) or $44.54 per ton delivered | $50.34 |
| 14. Cost of electricity 77 × .746 × 3.9 × .048 (cost per KWH) | $10.75 |
| 15. Total cost of energy 25.08 + 50.34 + 10.75 | $86.17 |
| 16. Cost for energy per pound of iron melted, 86.17 divided by 9000 = .0095 or approximately one cent | |

A comparison of the performance of the two furnaces illustrates the obvious savings in the cost of energy and in the difference in time to accomplish the desired result. The savings in dollars per furnace charge of $139.27 is dramatic in itself, representing a cut of more than 61% of the cost of operating the furnace. It also means a reduction in the percentage of oil required of 89% and a replacement with a readily available source of energy in the United States—coal.

The savings in time of almost an hour (52 minutes) per charge reflects not only a savings in money but an increase in melting capacity of approximately 20%.

The savings in dollars, in time and in oil are dramatically important in today's economy and represent an important breakthrough in this area of metallurgy.

In the foregoing specification I have set out certain preferred practices and embodiments of my invention; however, it will be understood that this invention may be otherwise embodied within the scope of the following claims.

I claim:

1. A rotary metal melting furnace comprising a generally cylindrical furnace rotatable about a horizontal axis, a charging opening at one end of said furnace on said horizontal axis, means for rotating said furnace about its axis, a burner opening at the other end of said furnace on said axis, burner means in said burner opening, said burner means including a generally cylindrical burner housing coaxial with the furnace housing, a fuel inlet tube spaced inwardly from and coaxial of the burner housing and forming a combustion air passage there-between said fuel inlet tube having spaced discharge and inlet ends, a refractory heat resistant imperforate generally conical diverter member on the discharge end of said inlet tube in the path of fuel in said fuel inlet tube forming a generally conical discharge pattern in the fuel leaving the fuel inlet tube around the exterior of said diverter member, a generally helical flight between the outer periphery of the inlet tube and the interior of the burner housing beginning at a point intermediate the ends of said inlet tube and within the combustion air passage surrounding the fuel inlet tube and terminating adjacent the diverter, means delivering pre-heated air to the combustion air passage spaced from the helical flight opposite the diverter member, means normally delivering pulverized coal in fluid suspension to said inlet tube adjacent the inlet end, means removably insertable into the inlet end of said fuel inlet tube for delivering a stream of fluid hydrocarbon fuel for furnace start-up and preheating when a cover is removed, recuperator means communicating with the exhaust opening of said furnace and coal pulverizing means adjacent the burner opening and fluidizing means receiving said pulverized coal and suspending said pulverized coal and delivering the same to said fuel inlet tube.

2. A rotary furnace as claimed in claim 1 wherein the helical flight is fixed to the outer periphery of the fuel inlet tube.

3. A rotary furnace as claimed in claim 1 wherein the diverter member is a generally conical ceramic member.

4. A rotary furnace as claimed in claim 1 having a fuel inlet tube formed of inner and outer telescoping members whereby the position of said inner tube may be varied relative to the the outer tube, said inner member carrying a generally conical ceramic diverter member.

5. A rotary furnace as claimed in claim 4 having rod means extending coaxially of the fuel inlet tube and engaging said inner fuel line and means of moving said rod axially of the inlet tube to move the inner inlet tube with respect to the outer inlet tube in telescoping relation.

6. A rotary furnace as claimed in claim 5 having recuperator means communicating with the exhaust opening of said furnace.

7. A rotary furnace as claimed in claim 5 having coal pulverizing means adjacent the burner opening and fluidizing means receiving said pulverized coal and suspending said pulverized coal and delivering the same to said fuel inlet line.

8. A rotary furnace as claimed in claim 1 or 2 or 3 or 4 having oxygen inlet means in the combustion air inlet passage.

* * * * *